Patented Feb. 20, 1951

2,542,466

UNITED STATES PATENT OFFICE 2,542,466

CYCLOHEXYL-PHENYL-AMINOALKYL-KETONES AND THEIR PRODUCTION

Frederick F. Blicke, Ann Arbor, Mich., assignor to The Regents of The University of Michigan, Ann Arbor, Mich., a corporation of Michigan No Drawing. Application August 23, 1947, Serial No. 770,329

7 Claims. (Cl. 260—570.5)

This invention relates to a class of polyfunctional basic organic compounds and to methods for obtaining the same. More particularly, the invention relates to substituted amines and their acid addition salts. The free bases of the amines of the present invention have the following formula,

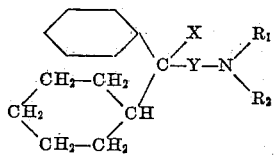

where X is —CN or —CO (lower alkyl), Y is an alkylene radical containing 2 to 6 carbon atoms inclusive and $R_1$ and $R_2$ represent the same or different lower alkyl radicals or when taken together with —N< a saturated heterocyclic ring such as piperidine, morpholine and pyrrolidine.

In accordance with my invention compounds of the above general formula are prepared by reacting an ω-di-substituted amino alkyl halide with cyclohexyl-phenyl-acetonitrile in the presence of al alkaline condensing agent such as sodamide to obtain the corresponding ω-di-substituted amino alkyl-cyclohexyl-phenyl-acetonitrile and then, in the case where the ketonic amines are desired, reacting the substituted acetonitrile with a lower alkyl magnesium halide and hydrolyzing the addition product so formed. The transformations which take place in my process may be diagrammatically illustrated as follows:

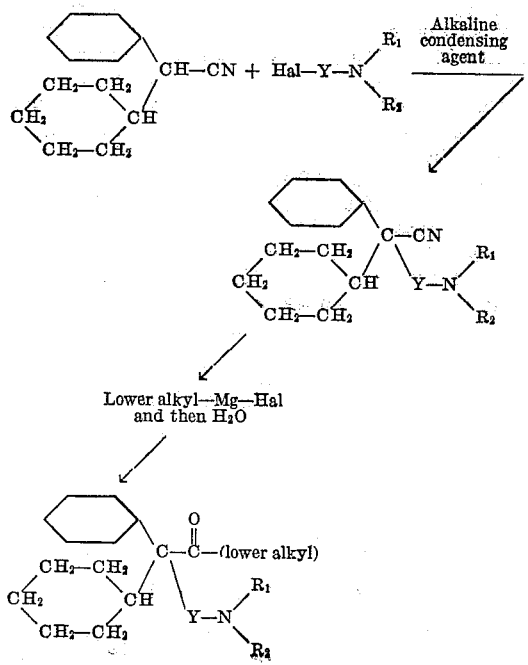

where $R_1$, $R_2$ and Y have the same significance as given above and Hal is a halogen atom.

The condensation of the cyclohexyl-phenyl-acetonitrile with the ω-di-substituted amino alkyl halide is preferably carried out in a substantially anhydrous, inert organic solvent such as ether, benzene, toluene, xylene and the like using the free base of the amino alkyl halide. However, it should be understood that my invention also includes employing the hydrohalide salts of the amino alkyl halides as starting materials. In this case two equivalents of the alkaline condensing agent are used and the reaction which takes place is, in effect, first a neutralization of the hydrohalide salt to liberate the free base of the alkyl halide which then reacts with the cyclohexyl-phenyl-acetonitrile in the desired manner.

The next step in my process, the reaction of the ω-di-substituted amino alkyl-cyclohexyl-phenyl acetonitrile with a lower alkyl magnesium halide, is carried out in the presence of a substantially anhydrous, inert organic solvent such as ether, benzene, toluene, xylene and the like and the resulting addition compound hydrolyzed preferably by treatment with an aqueous solution of a mineral acid.

An alternative method of preparing the amino nitriles of the present invention involves the reaction of a ω-di-substituted amino alkyl phenyl acetonitrile with a cyclohexyl halide in the presence of an alkaline condensing agent such as sodamide. This may be graphically illustrated as follows:

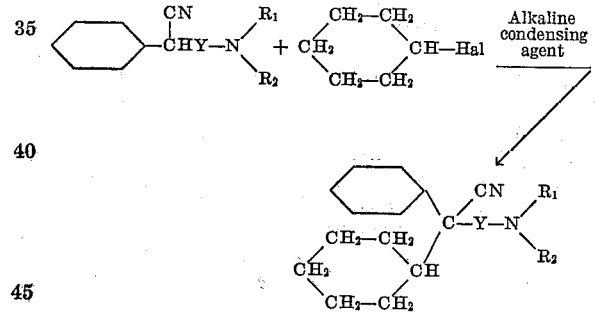

where Y, $R_1$, $R_2$ and Hal have the same significance as given above. The amino nitriles obtained by this process are identical with those produced by the first process described above and upon reaction with an alkyl magnesium halide followed by hydrolysis of the addition product they are converted to the amino ketones of the invention.

The free bases of the present invention may be converted to the corresponding acid addition salts by treatment with organic or inorganic acids. For example, some of the acids which may be used to prepare acid addition salts of these bases are: acetic, propionic, citric, benzoic, phthalic, succinic, hydrochloric, hydrobromic, sulfuric, sulfamic, phosphoric and the like acids. For most purposes the hydrohalide acid addition salts will be preferred because of the ease with which they can be prepared and recrystallized.

The compounds of the present invention are useful as intermediates in the preparation of other organic compounds. For example, the nitriles of the invention may be converted to the corresponding amino acids and esters by hydrolysis and alcoholysis while the ketones may be converted to the corresponding tertiary alcohols by treatment with an alkyl or aryl magnesium halide followed by hydrolysis of the addition product. The ketonic amines of the present invention also show a surprisingly high degree of analgetic activity and hence find use as pharmaceutical products.

The invention is illustrated by the following examples:

*Example 1*

(a) 39.8 g. of cyclohexyl phenyl acetonitrile is added slowly to a well stirred suspension of 7.8 g. of sodamide in 100 cc. of dry benzene keeping the temperature between about 45 and 50° C. The resulting mixture is stirred for about two hours, cooled to 20° C. and 22 g. of $\beta$-dimethylaminoethyl chloride added dropwise with stirring. After the addition has been completed the mixture is refluxed for three hours, cooled and poured into 250 cc. of water. The aqueous layer is discarded and the organic layer extracted with several portions of dilute hydrochloric acid. The acidic extracts are made alkaline with 10% sodium hydroxide solution and extracted with ether. The combined ether extracts are dried, the ether distilled and the residue distilled under reduced pressure to obtain the desired $\beta$-dimethylaminoethyl cyclohexyl phenyl acetonitrile; B. P. 145–8° C./0.5 mm. This compound which has the formula,

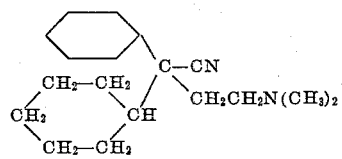

upon solution in absolute ethanol and treatment with alcoholic hydrogen chloride is converted to its hydrochloride salt. This white crystalline salt after the recrystallization melts at 225–6° C.

30 g. of $\beta$-dimethylaminoethyl cyclohexyl phenyl acetonitrile in 100 cc. of dry benzene is added dropwise to an ether solution of ethyl magnesium bromide prepared in 100 cc. of dry ether from 2.7 g. of magnesium and 12.1 g. of ethyl bromide. After the addition has been completed the mixture is refluxed for three hours, cooled and poured into 250 cc. of cold 4 N hydrochloric acid. The organic layer is discarded, the aqueous layer made alkaline with 10% sodium hydroxide solution and extracted with ether. The combined ether extracts are dried and the ether distilled. The residual oily ketimine is refluxed with 125 cc. of concentrated hydrochloric acid for fifteen hours. The solution is poured onto ice, made alkaline with concentrated ammonia and extracted with ether. After drying the ether is distilled to obtain the free base of the desired 1-cyclohexyl-1-phenyl-1-($\beta$-dimethylaminoethyl)butanone-2. This compound has the formula,

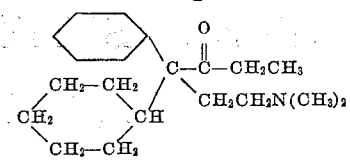

It can be converted to the hydrochloride salt by solution in hot absolute ethanol and treatment with an excess of alcoholic hydrogen chloride. The salt which separates in crystalline form is collected and purified by recrystallization from isopropanol; M. P. 209–10° C.

(b) 25 g. of $\beta$-dimethylaminoethyl phenyl acetonitrile dissolved in 40 cc. of dry toluene is added slowly to a well stirred suspension of 5.7 g. of sodamide in 40 cc. of dry toluene keeping the temperature between about 5 to 10° C. After the addition has been completed 22.8 g. of bromocyclohexane dissolved in 40 cc. of toluene is added dropwise to the cold mixture with stirring. The resulting mixture is refluxed for four hours, cooled and shaken with 200 cc. of cold water. The organic layer is separated and the toluene removed by distillation in vacuo. The residue is distilled in vacuo to obtain the desired $\beta$-dimethylaminoethyl cyclohexyl phenyl acetonitrile; B. P. 145–8° C./0.5 mm. This compound which is identical with the amino nitrile obtained by method (a) above can be converted to the hydrochloride salt by dissolving it in dry ether and adding an excess of dry hydrogen chloride to the solution. The salt is collected and recrystallized from isopropanol; M. P. 225 to 226° C. A mixed melting point of the hydrochloride salts of the amino nitrile prepared in this manner with the amino nitrile prepared by method (a) showed no depression.

16.2 g. of the $\beta$-dimethylaminoethyl cyclohexyl phenyl acetonitrile, prepared in the manner described above, upon reaction with ethyl magnesium bromide (prepared from 4.4 g. of magnesium and 19.7 g. of ethyl bromide) is converted to 1 - cyclohexyl - 1 - phenyl-1-($\beta$-dimethylaminoethyl)butanone-2. The amino ketone obtained in this manner is identical with that obtained in (a) above.

*Example 2*

39.8 g. of cyclohexyl phenyl acetonitrile is added slowly to a well stirred suspension of 7.8 g. of sodamide in 100 cc. of dry toluene keeping the temperature at about 45 to 50° C. and the resulting mixture stirred for about one hour. The reaction mixture is cooled to about 20° C. and 27.1 g. of $\beta$-diethylaminoethyl chloride added dropwise with stirring. After the addition has been completed the mixture is refluxed for three hours, cooled and poured into 250 cc. of cold water. The aqueous layer is discarded and the organic layer extracted with several portions of dilute hydrochloric acid. The acidic extracts are made alkaline with 10% sodium hydroxide solution and extracted with ether. The combined ether extracts are dried, the ether distilled and the residue distilled under reduced pressure to obtain the pure $\beta$-diethylaminoethyl cyclohexyl phenyl acetonitrile; B. P. 138–42° C./0.02 mm. This amino nitrile has the formula,

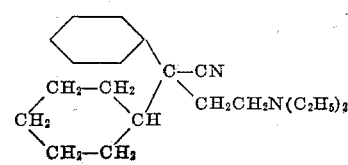

This same amino nitrile can be prepared as follows: 25 g. of β-diethylaminoethyl phenyl acetonitrile dissolved in 50 cc. of dry benzene is added slowly to a rapidly stirred suspension of 4.6 g. of sodamide in 50 cc. of dry benzene keeping the temperature at about 5 to 10° C. After the addition has been completed 19 g. of bromocyclohexane dissolved in a small amount of benzene is added dropwise with stirring and the resultant mixture then refluxed for about three to four hours. The reaction mixture is cooled, shaken with 300 cc. of cold water and the benzene layer separated. The benzene is removed by distillation in vacuo and the residue fractionated under reduced pressure to obtain the desired β-diethylaminoethyl cyclohexyl phenyl acetonitrile boiling at about 138–42° C./0.02 mm.

A solution of 35 g. of β-diethylaminoethyl cyclohexyl phenyl acetonitrile in 100 cc. of dry benzene is added dropwise to a refluxing ether solution of ethyl magnesium bromide prepared in 100 cc. of dry ether from 2.9 g. of magnesium and 13 g. of ethyl bromide. The resulting mixture is refluxed for three hours, cooled and poured into 250 cc. of cold 4 N hydrochloric acid. The acidic solution is separated, made alkaline with 10 N sodium hydroxide solution and extracted with ether. The combined ether extracts are dried and the ether distilled. The residual oily ketimine is refluxed with 125 cc. of concentrated hydrochloric acid for fifteen hours. The solution is poured onto ice, made alkaline with concentrated ammonia and extracted with ether. After drying the ether is distilled to obtain the free base of 1-cyclohexyl-1-phenyl-1-(β-diethylaminoethyl)butanone-2 which has the formula,

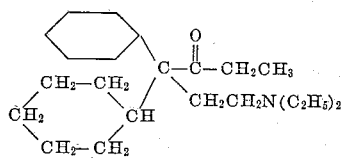

The free base can be converted to the hydrobromide salt by dissolving it in dry ether and treating the resulting solution with an excess of dry hydrogen bromide. The hydrobromide salt which separates is collected and purified by recrystallization from absolute ethanol.

*Example 3*

39.8 g. of cyclohexyl phenyl acetonitrile is added slowly to a well stirred suspension of 7.8 g. of sodamide in 100 cc. of dry benzene at a temperature of 45 to 50° C. and the resulting mixture stirred for about two hours. The reaction mixture is cooled to about 20° C. and 41.2 g. of γ-di-n-butylaminopropyl chloride added dropwise with stirring. After the addition has been completed the mixture is refluxed for three hours, cooled and poured into 250 cc. of cold water. The organic layer is separated, extracted with dilute hydrochloric acid and the acidic extracts made alkaline with 10% potassium hydroxide. The mixture is extracted with ether, the ether extract dried and the ether distilled. The residue is distilled under reduced pressure to obtain the desired γ-di-n-butylaminopropyl cyclohexyl phenyl acetonitrile; B. P. 175–8° C./0.03 mm. This compound has the formula,

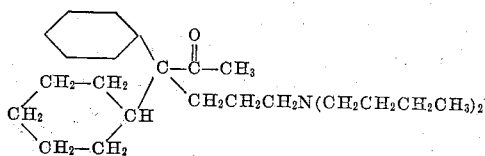

This amino nitrile can also be prepared by reaction of bromocyclohexane with β-di-n-butylaminoethyl phenyl acetonitrile. This is accomplished in the following manner: A solution of 27.1 g. of β-di-n-butylaminoethyl phenyl acetonitrile in 75 cc. of dry benzene is added slowly to a well stirred suspension of 4 g. of sodamide in 75 cc. of dry benzene keeping the temperature at about 5 to 10° C. 16.3 g. of bromocyclohexane dissolved in a small amount of dry benzene is added dropwise to the cold mixture with stirring and after the addition has been completed the mixture refluxed for three or four hours. After cooling, the reaction mixture is shaken with 300 cc. of cold water, the benzene layer separated and the benzene distilled off in vacuo. The residue is fractionated in vacuo to obtain the desired β-di-n-butylaminoethyl cyclohexyl phenyl acetonitrile boiling at about 175–8° C./0.03 mm.

40 g. of γ-di-n-butylaminopropyl cyclohexyl phenyl acetonitrile dissolved in 100 cc. of dry xylene is added dropwise to an ether solution of methyl magnesium iodide prepared in 100 cc. of dry ether from 2.6 g. of magnesium and 16 g. of methyl iodide. After the addition has been completed the mixture is refluxed for three hours, cooled and poured into 250 cc. of cold 4 N. hydrochloric acid. The acidic layer is removed, made alkaline with 10 N sodium hydroxide solution and extracted with ether. The combined ether extracts are dried and the ether distilled. The residual oily ketimine is refluxed with 125 cc. of concentrated hydrochloric acid for fifteen hours. The solution is poured onto ice, made alkaline with concentrated ammonia and extracted with ether. After drying the ether is distilled to obtain the free base of 1-cyclohexyl-1-phenyl-1-(γ-di-n-butylaminopropyl)propanone-2. The formula for this free base is, 10 g. of the free base is dissolved in dry ether and a dry ether solution containing an equivalent amount of citric acid added. The citrate salt which separates from the solution is collected and purified by washing it with dry ether.

*Example 4*

59.7 g. of cyclohexyl phenyl acetonitrile is added slowly to a suspension of 11.7 g. of sodamide in 150 cc. of dry toluene at 45 to 50° C. and the resulting mixture stirred for two hours. The mixture is cooled to about 20° C., 49.8 g. of β-dimethylamino-α-methylethyl bromide added dropwise with stirring and the mixture, after the addition has been completed, refluxed for about three hours. The reaction mixture is cooled, poured into 250 cc. of cold water and the organic layer separated and retained. The organic layer is extracted with dilute hydrochloric acid, the acidic extracts made alkaline with 10% sodium hydroxide solution and extracted with ether. The combined ether extracts are dried and the ether distilled to obtain the desired β-dimethyl-amino-α-methylethyl cyclohexyl phenyl acetonitrile. This compound which has the formula,

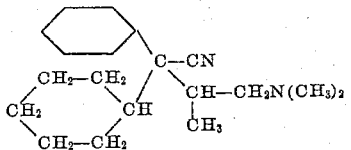

may be purified by fractional crystallization of its acid addition salts.

50 g. of β-dimethylamino-α-methylethyl cyclohexyl phenyl acetonitrile dissolved in 100 cc. of dry benzene is added slowly to an ether solution of ethyl magnesium iodide prepared in 150 cc. of dry ether from 4.3 g. of magnesium and 27.5 g. of methyl iodide. After the addition has been completed the mixture is refluxed for about three hours, cooled and poured slowly into 300 cc. of cold 4 N hydrochloric acid. The acidic layer is withdrawn, made alkaline with dilute sodium hydroxide solution and extracted with ether. After drying the combined extracts, the ether is distilled. The residual oily ketimine is refluxed with 125 cc. of concentrated hydrochloric acid for fifteen hours. The solution is poured onto ice, made alkaline with concentrated ammonia and extracted with ether. After drying the ether is distilled to obtain the desired 1-cyclohexyl-1-phenyl - 1 - (β-dimethylamino-α-methylethyl) - butanone-2. This amino ketone which has the formula,

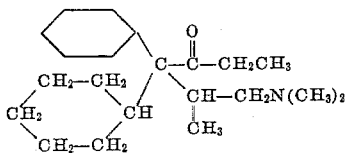

is dissolved in hot absolute ethanol and the solution treated with an excess of alcoholic hydrogen chloride. The hydrochloride salt which separates on cooling is collected and purified by recrystallization from absolute ethanol.

*Example 5*

59.7 g. of finely powdered cyclohexyl phenyl acetonitrile is added slowly to a rapidly stirred suspension of 11.7 g. of sodamide in 150 cc. of dry benzene at 45 to 50° C. and the resulting mixture stirred for about two hours. After cooling to about 20° C., 49.8 g. of β-dimethylaminopropyl bromide is added dropwise with stirring. After the addition has been completed the mixture is refluxed for about three hours, cooled and poured into 350 cc. of cold water. The organic layer is separated, extracted with dilute hydrochloric acid and the acidic extracts made alkaline with 10% sodium hydroxide solution. The solution is extracted with ether, the ether extracts dried and the ether distilled. The residue consists of the desired β-dimethylaminopropyl cyclohexyl phenyl acetonitrile. This compound which may be purified by distillation under reduced pressure has the formula,

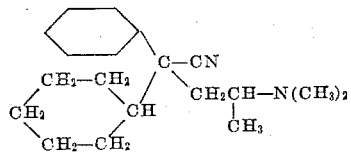

A solution of 50 g. of β-dimethylaminopropyl cyclohexyl phenyl acetonitrile in 150 cc. of dry benzene is added dropwise to a refluxing ether solution of ethyl magnesium bromide prepared in 150 cc. of dry ether from 4.3 g. of magnesium and 19.3 g. of ethylbromide. After the addition has been completed the mixture is refluxed for three hours, cooled and poured into 300 cc. of cold 4 N hydrochloric acid. The acidic solution is removed, made alkaline with 10 N sodium hydroxide and extracted with ether. The combined ether extracts are dried, the ether distilled and the residual ketimine refluxed with 150 cc. of concentrated hydrochloric acid for fifteen hours. The solution is poured onto ice, made alkaline with concentrated ammonia and extracted with ether. The ether extracts are dried and the ether distilled. The residue which consists of the free base of the desired 1-cyclohexyl-1-phenyl-1-(β-dimethylaminopropyl)butanone-2 is dissolved in hot absolute ethanol and the solution treated with an excess of alcoholic hydrogen chloride. The hydrochloride salt which separates on cooling is collected and purified by recrystallization from absolute ethanol. This salt has the formula,

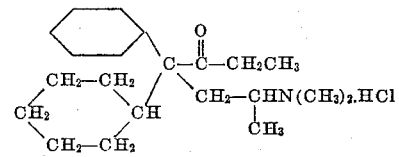

*Example 6*

39.8 g. of cyclohexyl phenyl acetonitrile is added slowly to a well stirred suspension of 7.8 g. of sodamide in 150 cc. of dry toluene keeping the temperature between about 45 to 50° C. After the addition has been completed the mixture is heated for two hours, cooled and 33 g. of β-piperidinopropyl chloride added dropwise to the rapidly stirred mixture. The reaction mixture is refluxed for three hours, cooled and poured into 300 cc. of cold water. The organic layer is separated, extracted with dilute hydrochloric acid and the acid extracts made alkaline with 10% sodium hydroxide solution. The solution is extracted with ether, the combined ether extracts dried and the ether removed by distillation. The residue which consists of the desired β-piperidinopropyl cyclohexyl phenyl acetonitrile is purified by distillation in vacuo. This amino nitrile has the formula,

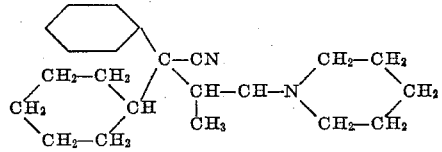

A solution of 50 g. of β-piperidinopropyl cyclohexyl phenyl acetonitrile in 150 cc. of dry benzene is added dropwise to a refluxing ether solution of methyl magnesium iodide prepared in 150 cc. of dry ether from 3 g. of magnesium and 17.6 g. of methyl iodide. After the addition has been completed the mixture is refluxed for three hours, cooled and the mixture poured slowly into 300 cc. of cold 4 N hydrochloric acid. The aqueous layer is separated, made alkaline with 10 N sodium hydroxide solution and extracted with ether. The combined ether extracts are dried and the ether distilled. The residual oily ketimine is refluxed with 125 cc. of concentrated hydrochloric acid for fifteen hours. The solution is poured onto ice, made alkaline with concentrated ammonia and extracted with ether. After drying the ether is distilled to obtain the desired free base of 1-cyclohexyl-1-phenyl-1-(β-piperidinopropyl) propanone-2. This compound which has the formula,

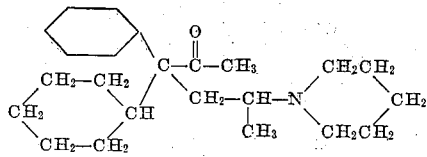

can be converted to the hydrobromide salt by dissolving it in dry ether and treating the solution with an excess of dry hydrogen bromide. The hydrobromide salt which separates from the solution is collected and purified by recrystallization from absolute ethanol.

Example 7

39.8 g. of cyclohexyl phenyl acetonitrile is added slowly to a well stirred suspension of 7.8 g. of sodamide in 150 cc. of dry benzene keeping the temperature between 45 and 50° C. After the addition has been completed the mixture is stirred for one and one-half hours, cooled to about 20° C. and 35.6 g. of δ-morpholinobutyl chloride added dropwise with stirring. The resulting mixture is refluxed for three hours, cooled and poured into 300 cc. of water. The organic layer is separated, extracted with dilute hydrochloric acid and the acidic extracts made alkaline with 10% sodium hydroxide solution. The solution is extracted with ether, the combined ether extracts dried and the ether distilled. The residue is distilled under reduced pressure to obtain the free base of δ-morpholinobutyl cyclohexyl phenyl acetonitrile which has the formula,

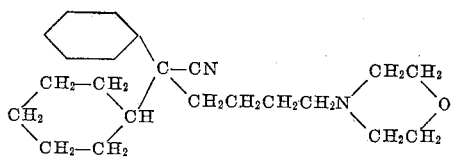

40 g. of δ-morpholinobutyl cyclohexyl phenyl acetonitrile in 150 cc. of dry xylene is added slowly to a refluxing ether solution of n-propyl magnesium bromide prepared in 150 cc. of dry ether from 2.9 g. of magnesium and 14.8 g. of n-propyl bromide. The resulting solution is refluxed for four hours, cooled and poured into 300 cc. of cold 4 N hydrochloric acid. The aqueous layer is separated, made alkaline with 10 N sodium hydroxide solution and extracted with ether. The combined ether extracts are dried and the ether distilled. The residual oily ketimine is refluxed with 125 cc. of concentrated hydrochloric acid for fifteen hours. The solution is poured onto ice, made alkaline with concentrated ammonia and extracted with ether. After drying the ether is distilled to obtain the free base of the desired 1-cyclohexyl-1-phenyl-1-(δ-morpholinobutyl)pentanone-2. This compound which has the formula,

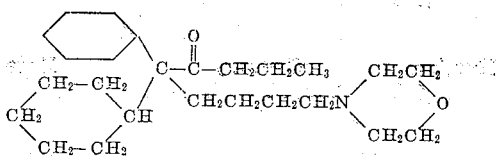

can be converted to its hydrochloride salt by dissolving it in dry ether and treating the resultant solution with dry hydrogen chloride. The hydrochloride salt which separates is collected and purified by recrystallization from absolute ethanol.

Example 8

39.8 g. of cyclohexyl phenyl acetonitrile is added slowly to a well stirred suspension of 7.8 g. of sodamide in 150 cc. of dry benzene keeping the temperature between about 45 to 50° C. After the addition has been completed the mixture is stirred for two hours, cooled to about 20° C. and 32.7 g. of β-diethylaminobutyl chloride added dropwise with stirring. The resulting mixture is refluxed for three hours, cooled and poured into 300 cc. of cold water. The organic layer is separated, extracted with dilute hydrochloric acid and the acidic extracts made alkaline with dilute sodium hydroxide solution. The mixture is extracted with ether, the ether extracts dried and the ether distilled. The residue is distilled under reduced pressure to obtain the desired β-diethylaminobutyl cyclohexyl phenyl acetonitrile. This compound has the formula,

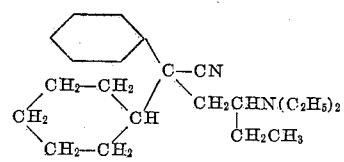

A solution of 45 g. of β-diethylaminobutyl cyclohexyl phenyl acetonitrile in 150 cc. of dry toluene is added dropwise to a refluxing ether solution of ethyl magnesium iodide prepared in 150 cc. of dry ether from 3.4 g. of magnesium and 21.8 g. of ethyl iodide. After the addition has been completed the mixture is refluxed for three hours, cooled and poured into 300 cc. of cold dilute hydrochloric acid. The aqueous layer is separated, made alkaline with dilute sodium hydroxide and extracted with ether. The combined ether extracts are dried and the ether distilled. The residual oily ketimine is refluxed with 125 cc. of concentrated hydrochloric acid for fifteen hours. The solution is poured onto ice, made alkaline with concentrated ammonia and extracted with ether. After drying the ether is distilled to obtain the desired 1-cyclohexyl-1-phenyl-1-(β-diethylaminobutyl)butanone-2 which has the formula,

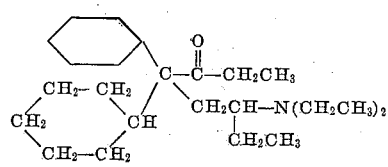

Example 9

39.8 g. of cyclohexyl phenyl acetonitrile is added slowly with stirring to a suspension of 7.8 g. of sodamide in 150 cc. of benzene while maintaining the temperature between 45 and 50° C. and the resulting mixture stirred for about two hours. The reaction mixture is cooled and 35.6 g. of γ-diethylamino-β,β-dimethylpropyl chloride added dropwise with stirring. After the addition has been completed the mixture is refluxed for three hours, cooled and poured into 300 cc. of cold water. The benzene layer is separated, extracted with dilute hydrochloric acid and the solution made alkaline with sodium hydroxide solution. The alkaline solution is extracted with ether, the combined ether extracts dried and the ether distilled. The residue consists of the desired γ-diethylamino-β,β-dimethylpropyl cyclohexyl phenyl acetonitrile which has the formula,

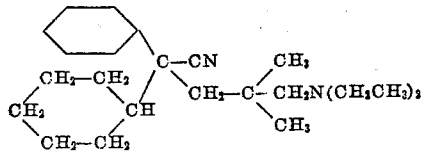

A solution of 45 g. of γ-diethylamino-β,β-dimethylpropyl cyclohexyl phenyl acetonitrile in 150 cc. of dry benzene is added dropwise to a refluxing ether solution of ethyl magnesium bromide prepared in 150 cc. of dry ether from 3.2 g. of magnesium and 14.5 g. of ethyl bromide. After the addition has been completed the mixture is refluxed for four hours, cooled and poured into 300 cc. of cold 4 N hydrochloric acid. The aqueous solution is separated, made alkaline with sodium hydroxide solution, extracted with ether and the combined ether extracts dried. The ether is distilled, the residual ketimine refluxed for fifteen hours with 125 cc. of concentrated hydrochloric acid and the solution poured onto ice. The mixture is made alkaline with concentrated ammonia, extracted with ether and the combined extracts dried. The ether is removed by distillation from the extract to obtain the free base of the desired 1-cyclohexyl-1-phenyl-1-(γ-diethylamino-β,β-dimethylpropyl) butanone-2. This compound which has the formula,

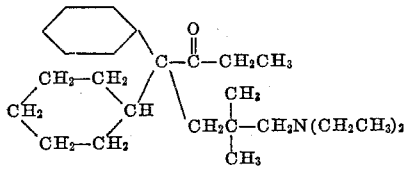

is converted to the hydrobromide salt by dissolving it in dry ether and treating the solution with an excess of dry hydrogen bromide. The hydrobromide salt which separates is collected and purified by recrystallization from absolute ethanol.

What I claim as my invention is:

1. A compound of the class consisting of a free base and its acid addition salts, said free base having the formula,

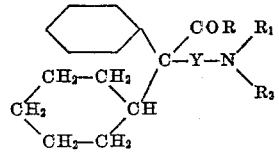

where R is lower alkyl, Y is alkylene containing 2 to 6 carbon atoms and $R_1$ and $R_2$ are members of the class consisting of lower alkyl radicals and further members wherein $R_1$ and $R_2$ taken together with —N< form piperidine, morpholine and pyrrolidine.

2. A compound having the formula,

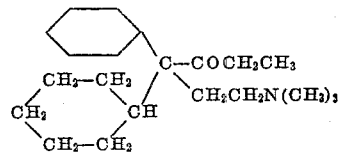

3. A compound having the formula,

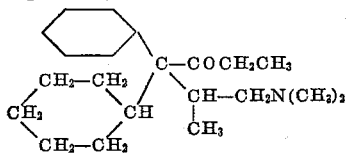

4. A compound having the formula,

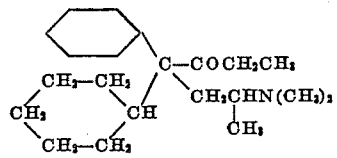

5. A process obtaining a compound of formula,

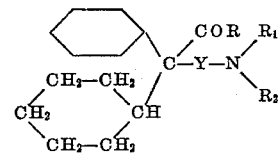

which comprises reacting a compound of formula

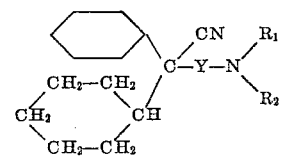

with a lower alkyl magnesium halide in a substantially anhydrous, inert organic solvent and hydrolyzing the addition product so formed, where Y is an alkylene radical containing 2 to 6 carbon atoms inclusive and $R_1$ and $R_2$ are members of the class consisting of lower alkyl radicals and further members wherein $R_1$ and $R_2$ taken together with —N< form piperidine, morpholine and pyrrolidine and R is lower alkyl.

6. A compound having the formula,

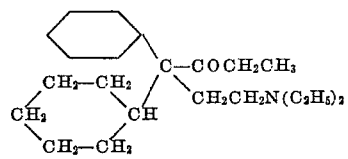

7. A compound having the formula,

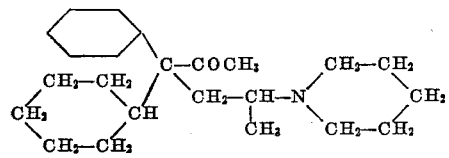

FREDERICK F. BLICKE.

REFERENCES CITED

The following references are of record in the file of this patent:

UNITED STATES PATENTS

| Number | Name | Date |
|---|---|---|
| 2,268,108 | Collie et al. | Dec. 30, 1941 |
| 2,397,799 | Martin et al. | Apr. 2, 1946 |

FOREIGN PATENTS

| Number | Country | Date |
|---|---|---|
| 552,065 | Great Britain | Mar. 22, 1943 |

OTHER REFERENCES

Ser. No. 114,710, Eidebenz (A. P. C.), published June 8, 1943.

Easton et al.; J. Am. Chem. Soc., vol. 69, pages 976–977 (1947).

Schultz et al.: J. Am. Chem. Soc., vol. 69, page 188 (1947).